United States Patent [19]

Pernod et al.

[11] 3,998,976

[45] Dec. 21, 1976

[54] LOW-CALORIE CONFECTION

[75] Inventors: Roger Pernod, St. Denis en Val, France; Willy Rufer, Geneva, Switzerland

[73] Assignee: Battelle Memorial Institute, Carouge, Switzerland

[22] Filed: Dec. 5, 1975

[21] Appl. No.: 638,072

[30] Foreign Application Priority Data

Dec. 9, 1974 Germany .......................... 2458650

[52] U.S. Cl. .............................. 426/103; 426/571; 426/572; 426/660; 426/804
[51] Int. Cl.² .......................................... A23G 3/00
[58] Field of Search ............ 426/804, 660, 103, 89, 426/571, 572

[56] References Cited

UNITED STATES PATENTS

| | | | |
|---|---|---|---|
| 3,023,104 | 2/1962 | Battista | 426/804 |
| 3,676,150 | 7/1972 | Glicksman et al. | 426/804 |
| 3,682,659 | 8/1972 | Jurczak et al. | 426/660 |
| 3,800,045 | 3/1974 | Brucker et al. | 426/660 |

Primary Examiner—Jeanette M. Hunter
Attorney, Agent, or Firm—Karl F. Ross; Herbert Dubno

[57] ABSTRACT

A low-calorie confection, having a combination of at least one layer of marshmallow and at least one layer of a homogeneous paste containing 20 to 30 per cent by weight of purified edible alpha cellulose powder, 3 to 5 per cent by weight of proteins, 3 to 10 per cent by weight of lipids, 45 to 60 per cent by weight of sugars and 10 to 15 per cent by weight of water, the calorific value of this paste being at most 300 calories per 100 grams.

9 Claims, No Drawings

LOW-CALORIE CONFECTION

This invention relates to a low-calorie food product.

At the present time, at least in those countries in which industry is highly developed and where the standard of living is high, there exists a strong demand for low-calorie food products. These products, without requiring the consumer to modify his eating habits, especially with regard to the quantity and nature of his food, are required to avoid the distressing consequences with regard to appearance and health which result from the absorption of a quantity of calories exceeding bodily needs.

Sugars, especially sucrose, and fats (lipids) in particular possess a high calorific content in a relatively small volume, and make the calories available in a form which may give rise to an accumulation of fats in the body to cause obesity, if these foodstuffs are eaten to an exaggerated extent.

For this reason the majority of low-calorie food products known at present contain artificial sweeteners in place of sucrose and/or comprise a low content of fat.

There are also low-calorie food products which contain a certain quantity of substances which cannot be digested by the body, such as algae derivatives, cellulose or cellulose derivatives such as methyl celluloses, carboxy methyl celluloses etc., to reduce the calorific value of such products for a given volume.

Nevertheless, the manufacture of low-calorie food products still gives rise to numerous problems.

One of the difficulties encountered in this field derives from the fact that the sugars and fats, besides their nourishment and organoleptic functions, also have the function of giving the foodstuffs certain characteristics which are a function of their texture, their consistency and their ability to dissolve or disperse on contact with the saliva etc.

These characteristics are of the highest importance in judging the quality of a food product because they are particularly considered during the actual consumption of the product. Furthermore, sugars play a large part in the preservation of food products, especially from microbial attack. This is why the replacement of all or part of the sugars by artificial sweetners often results in considerable deterioration of the food quality from the point of view of eating enjoyment, and also a reduction in their shelf life.

A further difficulty arises from the fact that the incorporation of cellulose or cellulose derivatives in the foodstuffs leads to a disagreeable sensation of dryness and the accumulation of residual matter in the mouth during the eating of such foodstuffs.

To lessen this latter difficulty, it has been proposed to incorporate in the food products aggregates of cellulose crystallites obtained by subjecting a natural fibrous cellulose material to acid hydrolysis designed to destroy the fibrous structure of the material by eliminating the amorphous parts of its cellulose structure.

For example, Swiss Pat. No. 401657 describes the preparation of foodstuffs comprising, in addition to at least one nutritive ingredient, cellulose crystallite aggregates, with a standardised degree of polymerization and of which at least 1 percent of the particles have a size of less than one micron, prepared by acid hydrolysis of natural fibrous cellulose materials.

Austrian Pat. No. 158264 also describes a process for the acid hydrolysis of fibrous cellulose materials and the use of the product obtained by the process as an ingredient for incorporation in a foodstuff to modify its dietetic properties.

The object of the present invention is to provide a food product of low calorific value (less than 300 to 350 calories per 100 grams) with appearance, consistency, organoleptic properties and taste and preservation characteristics comparable with those of traditional items of confectionery. The new product consists essentially of an unctuous paste of sugary taste flavored, for example, with almond or hazel nut cream, by using in the preparation of the said product instead of hydrolyzed cellulose of the type described in the two aforementioned patents, cellulose of foodstuff quality obtained by the ordinary purification of natural cellulose materials.

The calorific value of corresponding traditional confectionery items is very high, and generally lies between 600 and 700 calories per 100 grams.

The high calorific value of these items originates from the fact that the items contain large quantities of digestible sugars and fatty substances which are indispensable for obtaining their consistency and organoleptic properties. It would therefore at first appear to be impossible to replace a sufficiently large quantity of sugars and fatty materials in such confectionery items by a corresponding quantity of ingredients of lower calorific value to give a substantial reduction of the calorific value of the former, without causing considerable deterioration in the eating enjoyment and shelf life of such items.

This is however the result obtained by the present invention.

According to the present invention there is provided a low-calorie food product comprising the combination of at least one layer of marshmallow and at least one layer of a homogeneous paste containing 20 to 30 percent by weight of purified alpha cellulose of foodstuff quality, the calorific value of this paste being at the most 300 calories per 100 grammes.

Thus the food product according to the invention results from the combination of at least one layer of a homogeneous paste, having a low calorific value by the fact that it contains approximately 20 to 30 percent by weight of purified alpha cellulose (specially treated in known manner to allow human consumption), and at least one layer of marshmallow.

This latter product, which is known, consists of a homogeneous low density mass obtained by mixing with strong agitation a mass of sugar previously boiled in water, with an aqueous foaming suspension of gelatine and hydrolyzed calcium caseinate, this suspension also possibly containing a small proportion of at least one substance able to stabilize the foam, such as a carrageenate.

Preferably, the ratio of the volume occupied by the marshmallow to the volume occupied by the paste containing the alpha cellulose powder lies between 0.5 and 1, with an optimum value of about 0.66.

For example, the food product according to the invention may consist of a confectionery item in the form of a prismatic stick of square cross-section, 16 mm wide and 60 mm long, consisting of a layer of marshmallow 6.4 mm thick and a layer of homogeneous paste containing alpha cellulose and having a composition lying between the limits specified heretofore, 9.6 mm thick.

The number of marshmallow layers and layers of paste containing alpha cellulose may be greater than one, the layers then being disposed alternately to form the final products.

The food product according to the invention may, at least partially, be surrounded in traditional manner by an edible outer coating consisting of a layer of chocolate or any other usual food substance.

Preferably, the paste containing the cellulose also contains 3 to 5 percent by weight of proteins, 3 to 10 percent by weight of lipids, 45 to 60 percent by weight of sugars and 10 to 15 percent by weight of water.

The food product according to the present invention overcomes the problem, previously encountered in the use of cellulose materials, of unpalatability.

The composition of the homogeneous paste containing the alpha cellulose may, for example, correspond to one of the two following formulations:

| Formulation No. 1 (in per cent by weight): | |
|---|---|
| normal hazel nut paste | 10 to 15 |
| toasted hazel nut puree | 3 to 5 |
| full fat soya flour | 2.5 to 4 |
| lecithin | 1 to 3 |
| sorbitol | 5 to 10 |
| "glucose syrup" (hydrolyzed starch with a "dextrose equivalent" of 42 and a content of dry matter corresponding to 45 degrees Baume) | 20 to 30 |
| "fructose syrup" (unrefined syrup originating from the production of fructose. This is a product with a content of dry matter of 70 per cent by weight) | 10 to 18 |
| sucrose | 5 to 10 |
| gelatine | 0.5 to 1 |
| powdered cellulose (containing 99.5 per cent by weight of purified alpha cellulose, of foodstuff quality | 24 |
| water | 4.74 |

The calorific value of the paste corresponding to formulation No. 1 lies between 275 and 300 calories per 100 grams.

| Formulation No. 2 (in per cent by weight): | |
|---|---|
| hydrogenated ground nut oil | 3.5 to 8 |
| full fat soya flour | 0.2 to 1 |
| sorbitol | 5 to 10 |
| sucrose | 5 to 10 |
| "glucose syrup" | 20 to 30 |
| "fructose syrup" | 10 to 18 |
| powdered cellulose (containing 99.5 per cent by weight of purified alpha cellulose, of foodstuff quality) | 23 to 25 |
| skimmed milk powder (containing 35 per cent of proteins, 51.9 per cent of sugars and 0.97 per cent of lipids by weight) | 12 to 18 |

The calorific value of the paste corresponding to formulation No. 2 lies between 270 and 290 calories per 100 grams.

The invention equally relates to a process for preparing the food product heretofore described.

In this process a solid body is formed from the combination of at least one layer of marshmallow and at least one layer of a homogeneous paste containing 20 to 30 percent by weight of purified alpha cellulose powder of foodstuff quality, the calorific value of this latter paste being at most 300 calories per 100 grams.

Preferably, the ratio of the total marshmallow volume to the total volume of the paste containing the cellulose lies between 0.5 and 1, with an optimum value of the order of 0.66.

Equally preferably, the paste containing the cellulose also contains 3 to 5 percent by weight of proteins, 3 to 10 percent by weight of lipids, 45 to 60 percent by weight of sugars and 10 to 15 percent by weight of water.

What we claim is:

1. A low-calorie confection, comprising the combination of at least one layer of marshmallow and at least one layer of a homogeneous paste containing 20 to 30 percent by weight of purified edible alpha cellulose powder, 3 to 5 percent by weight of proteins, 3 to 10 percent by weight of lipids, 45 to 60 percent by weight of sugars and 10 to 15 percent by weight of water, the califoric value of this paste being at most 300 calories per 100 grams.

2. A confection as defined in claim 1, wherein the ratio of the volume occupied by the marshmallow to the volume occupied by the paste containing the alpha cellulose powder lies between 0.5 and 1.

3. a confection as defined in claim 2, wherein said ratio is about 0.66.

4. A confection as defined in claim 1, wherein the paste containing the cellulose has the following composition, expressed as percent by weight:

| hazel nut paste | 10 to 15 |
|---|---|
| toasted hazel nut puree | 3 to 5 |
| full fat soya flour | 2.5 to 4 |
| lecithin | 1 to 3 |
| sorbitol | 5 to 10 |
| hydrolyzed starch having a "D.E.", of 42 and a Baume of 45 degrees. | 20 to 30 |
| unrefined syrup from the production of fructose. having a content of dry matter of 70 percent by weight | 10 to 18 |
| sucrose | 5 to 10 |
| powdered cellulose containing 99.5 per cent by weight of purified edible alpha cellulose | 24 |
| water | 4.74. |

5. A confection as defined in claim 1, wherein the paste containing the alpha cellulose powder has the following composition expressed as percent by weight:

| hydrogenated ground nut oil | 3.5 to 8 |
|---|---|
| full fat soya flour | 0.2 to 1 |
| sorbitol | 5 to 10 |
| saccharose sucrose | 5 to 10 |
| hydrolyzed starch having a D. E. of 42 and a Baume of 45 degrees | 20 to 30 |
| unrefined syrup from the production of fructose having a content of dry matter of 70% per cent by weight | 10 to 18 |
| powdered cellulose containing 99.5 per cent by weight of edible purified alpha cellulose | 23 to 25 |
| skimmed milk powder containing 35 per cent by weight of proteins, 51.9 per cent by weight of | |

| sugars and 0.97 per cent by weight of lipids | 12 to 18. |

6. A food product as defined claim 1 which is at least partially surrounded by an edible outer coating.

7. A process for preparing a low-calorie confection comprising, of at least one layer of marshmallow and adding at least one layer of a homogeneous paste containing 20 to 30 percent by weight of purified edible alpha cellulose powder, 3 to 5 percent by weight of proteins, 3 to 10 cent by weight of lipids, 45 to 60 percent by weight of sugars and 10 to 15 percent by weight of water the calorific value of this latter paste being at most 30 calories per 100 grams whereby a solid body is formed of the combination.

8. A process as defined in claim 7, wherein the ratio of the volume occupied by the marshmallow paste to the volume occupied by the paste containing the alpha cellulose powder lies between 0.5 and 1.

9. A process as defined in claim 8, wherein said ratio is equal to 0.66.

* * * * *